US009091585B2

(12) United States Patent
Turner

(10) Patent No.: US 9,091,585 B2
(45) Date of Patent: Jul. 28, 2015

(54) SMART PHONE SCALE THAT USES THE BUILT-IN BAROMETRIC PRESSURE SENSOR OR ORIENTATION SENSORS TO CALCULATE WEIGHT

(71) Applicant: RAF TECHNOLOGY, INC., Redmond, WA (US)

(72) Inventor: Bryan Turner, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 245 days.

(21) Appl. No.: 13/862,259

(22) Filed: Apr. 12, 2013

(65) Prior Publication Data

US 2014/0224551 A1 Aug. 14, 2014

Related U.S. Application Data

(60) Provisional application No. 61/762,522, filed on Feb. 8, 2013.

(51) Int. Cl.
*G01G 5/00* (2006.01)
*G01G 1/18* (2006.01)
(Continued)

(52) U.S. Cl.
CPC ............. *G01G 5/006* (2013.01); *G01G 1/18* (2013.01); *G01G 3/00* (2013.01); *G01G 5/04* (2013.01);
(Continued)

(58) Field of Classification Search
CPC ............ H04B 1/3888; H04B 2001/3894; G01G 5/00; G01G 5/003; G01G 5/006; G01G 19/40; G01G 19/52; G01G 21/22; G01G 21/28; G01G 21/283; G01G 21/286; G01G 21/30; G01G 23/01; G01G 23/14; G01G 19/414; G01G 3/00; G01G 23/3742; G01G 5/04; G01G 9/00; H04M 1/18; H04M 1/72522; H04M 1/72527; H04M 2250/12; H04M 1/0254; G01C 9/00; G01C 9/06; G06F 1/1626; G06F 3/0346; G06F 3/039
See application file for complete search history.

(56) References Cited

U.S. PATENT DOCUMENTS 2,538,369 A 1/1951 Leary
3,386,574 A 6/1968 Kaplan
(Continued)

FOREIGN PATENT DOCUMENTS

CN 101448035 * 6/2009
CN 101692680 * 4/2010
(Continued)

OTHER PUBLICATIONS

WIPOTEC Principle of Operation; retrieved from the internet on Sep. 13, 2007 at http://www.industrialcontroller.com/wipotec/operation.htm; 2 Pages.
(Continued)

*Primary Examiner* — Randy W Gibson
(74) *Attorney, Agent, or Firm* — Stolowitz Ford Cowger LLP

(57) ABSTRACT

A weighing assembly (100,500,600) includes a portable computing device ("PCC") (112) such as a smart phone, pad computer, laptop computer, or the like. The weighing assembly utilizes one or more features of the portable computing device in order to weigh an item, under control of a scale application program or "app" executable in the portable computing device. Some embodiments may utilize an internal barometric pressure sensor of the PCC. Other embodiments may utilize orientation or position sensors of the PCC for weighing an item. Other embodiments may utilize a compressible foot element (1004), all for weighing an item. Preferably, a user interface (114) of the PCC, such as a touch screen, may be used to interact with the scale application program for calibration and other functions.

7 Claims, 6 Drawing Sheets

(51) Int. Cl.

| | | |
|---|---|---|
| G01G 19/52 | (2006.01) | |
| G01G 21/28 | (2006.01) | |
| G01G 23/14 | (2006.01) | |
| H04M 1/02 | (2006.01) | |
| G01G 9/00 | (2006.01) | |
| G01G 5/04 | (2006.01) | |
| G01G 3/00 | (2006.01) | |
| G01G 21/22 | (2006.01) | |
| H04M 1/21 | (2006.01) | |
| H04M 1/18 | (2006.01) | |
| H04M 1/725 | (2006.01) | |
| H04B 1/38 | (2015.01) | |
| G01C 9/06 | (2006.01) | |
| H04B 1/3888 | (2015.01) | |
| G01G 23/00 | (2006.01) | |

(52) U.S. Cl.
CPC .......... *G01G 9/00* (2013.01); *G01G 19/52* (2013.01); *G01G 21/22* (2013.01); *G01G 21/28* (2013.01); *G01G 23/14* (2013.01); *H04M 1/21* (2013.01); *H04M 1/72527* (2013.01); *G01C 9/06* (2013.01); *G01G 23/002* (2013.01); *H04B 1/3888* (2013.01); *H04B 2001/3894* (2013.01); *H04M 1/0254* (2013.01); *H04M 1/18* (2013.01); *H04M 1/72522* (2013.01); *H04M 2250/12* (2013.01)

(56) References Cited

U.S. PATENT DOCUMENTS

| Number | Type | Date | Name | Ref |
|---|---|---|---|---|
| 3,431,830 | A | 3/1969 | Stovall | |
| 3,566,717 | A | 3/1971 | Berman | |
| 3,648,839 | A | 3/1972 | Bradshaw | |
| 3,791,473 | A | 2/1974 | Rosen | |
| 3,796,424 | A | 3/1974 | Fox | |
| 3,805,904 | A | 4/1974 | Zimmerer | |
| 3,811,523 | A * | 5/1974 | Artwick et al. | 177/180 |
| 3,834,474 | A | 9/1974 | Knol | |
| 3,957,570 | A | 5/1976 | Helm | |
| 4,056,156 | A * | 11/1977 | Dayton | 177/209 |
| 4,170,350 | A | 10/1979 | Conti | |
| 4,262,763 | A | 4/1981 | Raskin | |
| 4,313,510 | A * | 2/1982 | Tomlinson, Jr. | 177/165 |
| 4,347,905 | A * | 9/1982 | Berckes | 177/149 |
| 4,384,629 | A * | 5/1983 | Kotzin | 177/224 |
| 4,461,363 | A | 7/1984 | Loy | |
| 4,522,277 | A * | 6/1985 | Kotzin | 177/250 |
| 4,534,551 | A | 8/1985 | Jones | |
| 4,696,358 | A | 9/1987 | Doerman | |
| 4,788,930 | A * | 12/1988 | Matteau et al. | 177/16 |
| 4,792,002 | A * | 12/1988 | Ward | 177/200 |
| 4,848,492 | A | 7/1989 | Hubbard | |
| 4,916,391 | A | 4/1990 | Doerman | |
| 5,019,991 | A | 5/1991 | Sansone | |
| 5,058,422 | A * | 10/1991 | Shimauchi | 73/1.13 |
| 5,092,415 | A * | 3/1992 | Asano | 177/208 |
| 5,133,212 | A * | 7/1992 | Grills et al. | 73/296 |
| 5,161,628 | A * | 11/1992 | Wirth | 177/137 |
| 5,170,856 | A * | 12/1992 | Yang | 177/209 |
| 5,172,900 | A | 12/1992 | Uno | |
| 5,259,607 | A | 11/1993 | Hironori | |
| 5,303,913 | A | 4/1994 | Trouquilla | |
| 5,308,932 | A | 5/1994 | Manduley | |
| 5,393,939 | A | 2/1995 | Nasuta, Jr. | |
| 5,465,662 | A | 11/1995 | Keung | |
| 5,480,085 | A | 1/1996 | Smithe | |
| 5,499,810 | A | 3/1996 | Tranquilla | |
| 5,524,878 | A | 6/1996 | Trouquilla | |
| 5,547,034 | A | 8/1996 | Wurz | |
| 5,606,516 | A * | 2/1997 | Douglas et al. | 702/104 |
| 5,689,092 | A | 11/1997 | Wurz | |
| 5,717,167 | A * | 2/1998 | Filing et al. | 177/136 |
| 5,767,452 | A | 6/1998 | Yankloski | |
| 5,850,057 | A | 12/1998 | Veillette | |
| 5,850,757 | A * | 12/1998 | Wierenga | 73/296 |
| 5,856,637 | A | 1/1999 | Vande Berg | |
| 5,869,092 | A | 2/1999 | Hays | |
| 5,879,000 | A | 3/1999 | Kakuta | |
| 5,902,964 | A | 5/1999 | Solberg, Jr. | |
| 5,904,219 | A * | 5/1999 | Anahid et al. | 180/273 |
| 5,939,646 | A | 8/1999 | Fowler | |
| 5,957,491 | A * | 9/1999 | Cech et al. | 280/735 |
| 5,959,257 | A * | 9/1999 | Campbell et al. | 177/16 |
| 5,998,742 | A | 12/1999 | Liu | |
| 6,089,106 | A * | 7/2000 | Patel et al. | 73/862.582 |
| 6,141,883 | A | 11/2000 | Mitchell | |
| 6,268,573 | B1 * | 7/2001 | Hartselle, III | 177/148 |
| 6,276,421 | B1 | 8/2001 | Valenti | |
| 6,464,219 | B1 | 10/2002 | Yee | |
| 6,497,522 | B2 | 12/2002 | Wotton | |
| 6,781,067 | B2 * | 8/2004 | Montagnino et al. | 177/25.13 |
| 6,785,566 | B1 * | 8/2004 | Irizarry | 455/575.8 |
| 6,820,873 | B2 | 11/2004 | Kulpa | |
| 6,839,694 | B2 | 1/2005 | Kasmin | |
| 6,864,436 | B1 * | 3/2005 | Nobes et al. | 177/25.13 |
| 6,940,025 | B1 | 9/2005 | Salomon | |
| 7,014,187 | B2 | 3/2006 | Mayerberg, II | |
| 7,047,827 | B1 * | 5/2006 | Mithal | 73/862.581 |
| 7,096,152 | B1 | 8/2006 | Ong | |
| 7,182,334 | B2 | 2/2007 | Spence | |
| 7,241,955 | B2 | 7/2007 | Hebenstreit | |
| 7,271,352 | B2 | 9/2007 | Rabindran | |
| 7,297,879 | B2 | 11/2007 | Salomon | |
| 7,405,368 | B2 | 7/2008 | Beck | |
| 7,550,681 | B2 | 6/2009 | Wang | |
| 7,687,727 | B2 | 3/2010 | Turner | |
| 7,779,956 | B2 * | 8/2010 | Breed et al. | 180/273 |
| 7,820,923 | B1 | 10/2010 | Daboub | |
| 7,838,781 | B2 | 11/2010 | Streder | |
| 7,842,892 | B2 * | 11/2010 | Wang | 177/144 |
| 8,106,315 | B2 | 1/2012 | Turner | |
| 8,129,635 | B2 | 3/2012 | Turner | |
| 8,133,147 | B2 | 3/2012 | Scekic et al. | |
| 8,148,650 | B2 | 4/2012 | Sye | |
| 8,153,911 | B2 | 4/2012 | Turner | |
| 8,178,796 | B2 | 5/2012 | Allen | |
| 8,399,764 | B2 * | 3/2013 | Klosky | 174/50 |
| 8,481,870 | B2 | 7/2013 | Turner | |
| 8,481,871 | B2 | 7/2013 | Turner | |
| 8,530,762 | B2 | 9/2013 | Turner | |
| 8,530,764 | B2 | 9/2013 | Monti | |
| 8,610,007 | B2 * | 12/2013 | Chen | 177/25.13 |
| 8,698,014 | B1 * | 4/2014 | Walstad | 177/126 |
| 8,981,919 | B2 * | 3/2015 | Massey et al. | 340/442 |
| 8,989,971 | B2 * | 3/2015 | Dell' Eva | 701/51 |
| 8,991,265 | B2 * | 3/2015 | Dekker et al. | 73/862.045 |
| 2003/0052035 | A1 * | 3/2003 | Dickinson | 206/522 |
| 2005/0103535 | A1 * | 5/2005 | Honda et al. | 177/187 |
| 2005/0181745 | A1 * | 8/2005 | Wood et al. | 455/90.3 |
| 2005/0205307 | A1 | 9/2005 | Salomon | |
| 2005/0267848 | A1 | 12/2005 | Kenbeek | |
| 2006/0003709 | A1 * | 1/2006 | Wood | 455/90.3 |
| 2006/0044268 | A1 * | 3/2006 | Robin et al. | 345/158 |
| 2006/0278443 | A1 * | 12/2006 | Salgo et al. | 177/100 |
| 2007/0045944 | A1 | 3/2007 | Ban | |
| 2007/0215663 | A1 * | 9/2007 | Chongson et al. | 224/930 |
| 2007/0272450 | A1 * | 11/2007 | Skinner et al. | 177/144 |
| 2008/0042340 | A1 | 2/2008 | Linder | |
| 2009/0017880 | A1 * | 1/2009 | Moore et al. | 455/575.1 |
| 2009/0071728 | A1 | 3/2009 | Turner | |
| 2009/0216487 | A1 | 8/2009 | Streder et al. | |
| 2010/0006346 | A1 | 1/2010 | Turner | |
| 2010/0082389 | A1 | 4/2010 | Turner | |
| 2010/0236838 | A1 * | 9/2010 | Shrak et al. | 177/1 |
| 2010/0282521 | A1 | 11/2010 | Turner | |
| 2010/0294572 | A1 | 11/2010 | Turner | |
| 2011/0004441 | A1 | 1/2011 | Turner | |
| 2011/0005648 | A1 * | 1/2011 | Sa | 150/154 |
| 2011/0049800 | A1 | 3/2011 | deJong | |
| 2011/0226035 | A1 * | 9/2011 | Date | 73/1.13 |
| 2011/0242744 | A1 * | 10/2011 | Klosky | 361/679.01 |

(56) References Cited

U.S. PATENT DOCUMENTS

| | | | | |
|---|---|---|---|---|
| 2011/0272197 A1* | 11/2011 | Mekid | ............................ | 177/127 |
| 2011/0290569 A1 | 12/2011 | Turner | | |
| 2012/0061134 A1* | 3/2012 | Kennedy | ........................ | 174/377 |
| 2012/0166362 A1 | 6/2012 | Turner | | |
| 2012/0181091 A1* | 7/2012 | Lieu | .................................. | 177/1 |
| 2012/0211285 A1* | 8/2012 | Hornstein | ...................... | 177/208 |
| 2012/0270599 A1* | 10/2012 | Mori et al. | .................. | 455/556.1 |
| 2012/0285751 A1 | 11/2012 | Turner | | |
| 2013/0126533 A1* | 5/2013 | Klosky | ............................ | 220/560 |
| 2013/0239648 A1 | 9/2013 | Turner | | |
| 2014/0020961 A1* | 1/2014 | Luo et al. | ..................... | 177/25.15 |
| 2014/0089231 A1* | 3/2014 | Jhunja et al. | ................... | 705/407 |
| 2014/0131120 A1* | 5/2014 | Horst et al. | .................. | 177/25.13 |
| 2014/0297067 A1* | 10/2014 | Malay | ................................ | 701/4 |
| 2014/0318874 A1* | 10/2014 | Moses et al. | ....................... | 177/1 |

FOREIGN PATENT DOCUMENTS

| | | |
|---|---|---|
| EP | 2172751 | 4/2010 |
| EP | 2195621 | 6/2010 |
| EP | 2302339 | 3/2011 |
| EP | 2400276 | 12/2011 |
| SE | WO 9002927 A1 * | 3/1990 ............... G01G 5/00 |
| WO | WO 2007/031176 | 3/2007 |
| WO | WO 2009/036251 | 3/2009 |

OTHER PUBLICATIONS

International Bureau, International Preliminary Report on Patentability, Chapter I of the PCT, for Application No. PCT/US2008/076140, International Filing Date Sep. 12, 2008, Mail Date Mar. 25, 2010.

International Searching Authority USPTO; International Search Report and Written Opinion for PCT/US2008/076140; Jan. 7, 2009; 14 pages.

European Patent Office, European Search Report for Application No. 09252332.3-2213, mail date Dec. 3, 2009; 7 pages.

Extended European Search Report dated Aug. 13, 2013, for related European Patent Application No. 13167924.3 filed on May 15, 2013; 5 pages.

Extended European Search Report dated Sep. 11, 2013, for related European Patent Application No. 112504593.2 filed on Apr. 11, 2011; 6 pages.

Stolowitz Ford Cowger LLP Listing of Related Matters dated Jul. 17, 2014; 1 page.

* cited by examiner

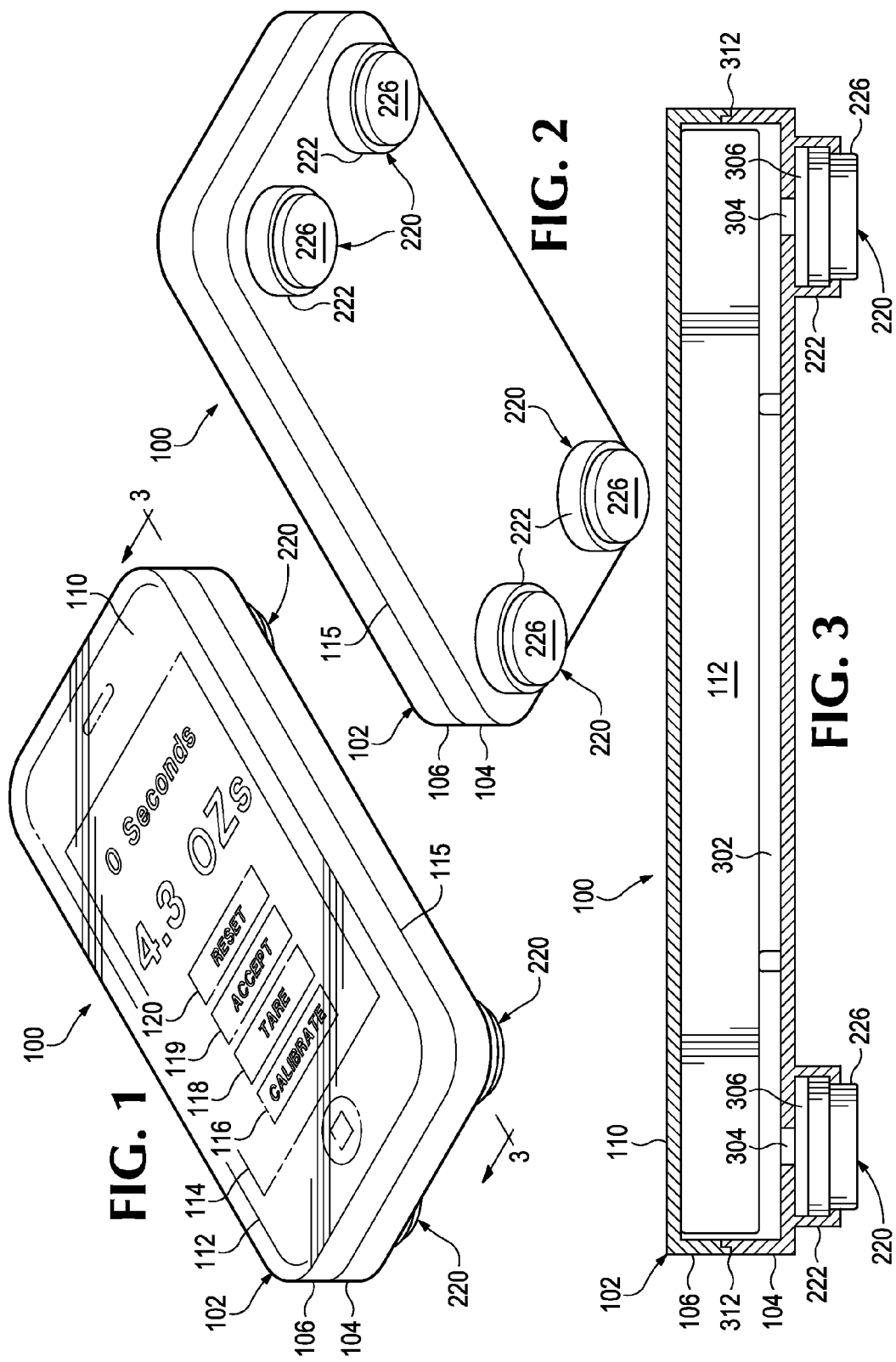

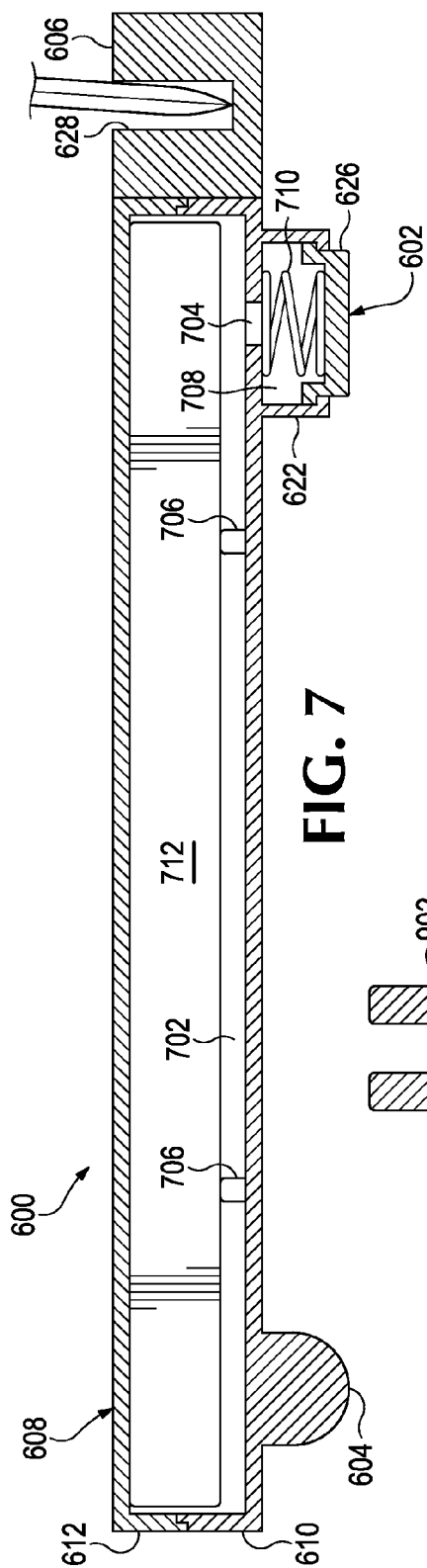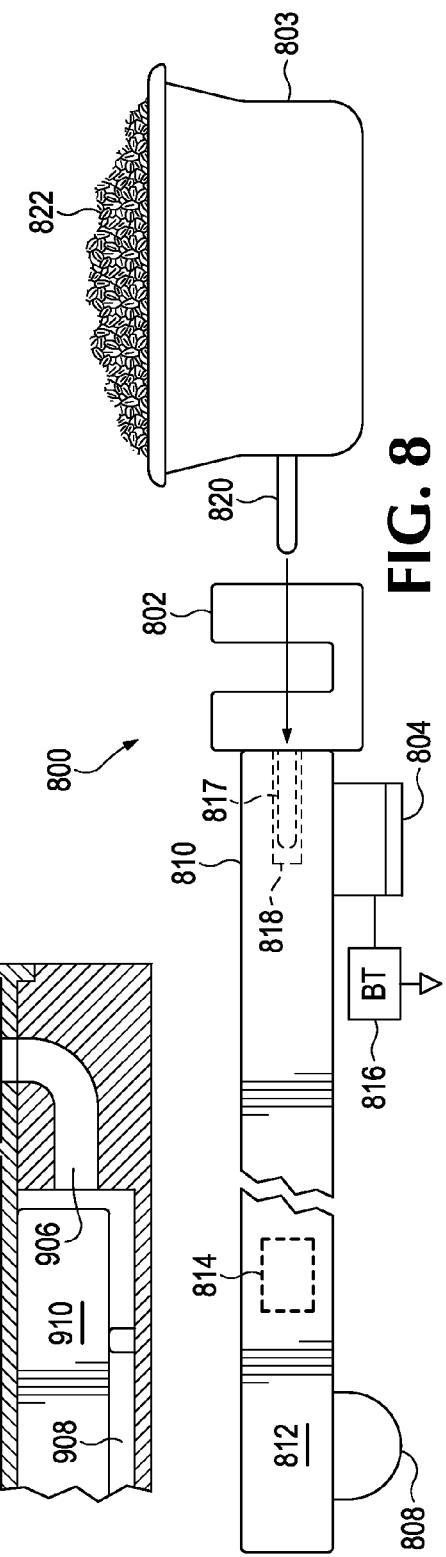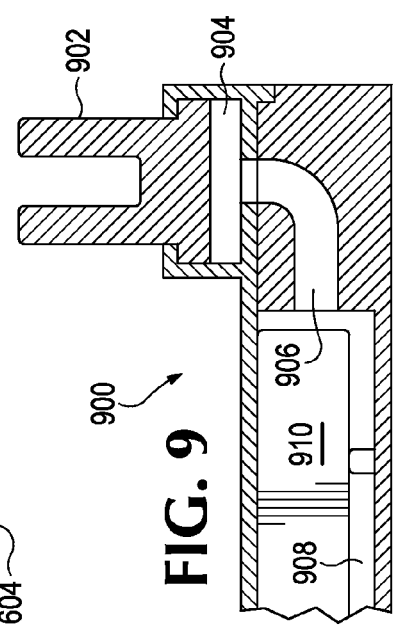

SMART PHONE SCALE THAT USES THE BUILT-IN BAROMETRIC PRESSURE SENSOR OR ORIENTATION SENSORS TO CALCULATE WEIGHT

RELATED APPLICATIONS

This application is a non-provisional of, and claims priority to, U.S. provisional application No. 61/762,522 filed Feb. 8, 2013 which is incorporated herein by this reference.

COPYRIGHT NOTICE

©2013 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The disclosed technology pertains to portable methods and apparatus for weighing an item.

BACKGROUND OF THE INVENTION

Scales date back to biblical times. The need remains for improved scales that are small, portable, and accurate for weighing relatively small items such as mail pieces to determine correct postage.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The current invention proposes multiple different embodiments for implementing a small portable scale. The embodiments have in common leveraging the screen display and other electronics typically provided in a portable computing device such as a smart phone, pad computer, laptop computer, iPhone®, iPad® or the like.

Additional aspects and advantages of this invention will be apparent from the following detailed description of preferred embodiments, which proceeds with reference to the accompanying drawings.

BRIEF DESCRIPTION OF THE DRAWINGS

FIG. 1 is a perspective view of a weighing assembly in accordance with a first embodiment.

FIG. 2 is a bottom perspective view of the weighing assembly of FIG. 1 showing a plurality of foot assemblies.

FIG. 3 is a cross-sectional view of the weighing assembly taken along line 3-3 of FIG. 1.

FIG. 7 is a cross-sectional view of the weighing assembly of FIG. 6 taken along line 7-7 of FIG. 6 and showing an integrated item receptacle.

FIG. 8 is a side view of a fourth embodiment showing a removable item receptacle.

FIG. 9 is a partial side view of a fifth embodiment showing an alternative item receptacle.

DETAILED DESCRIPTION OF PREFERRED EMBODIMENTS

Figure 4:
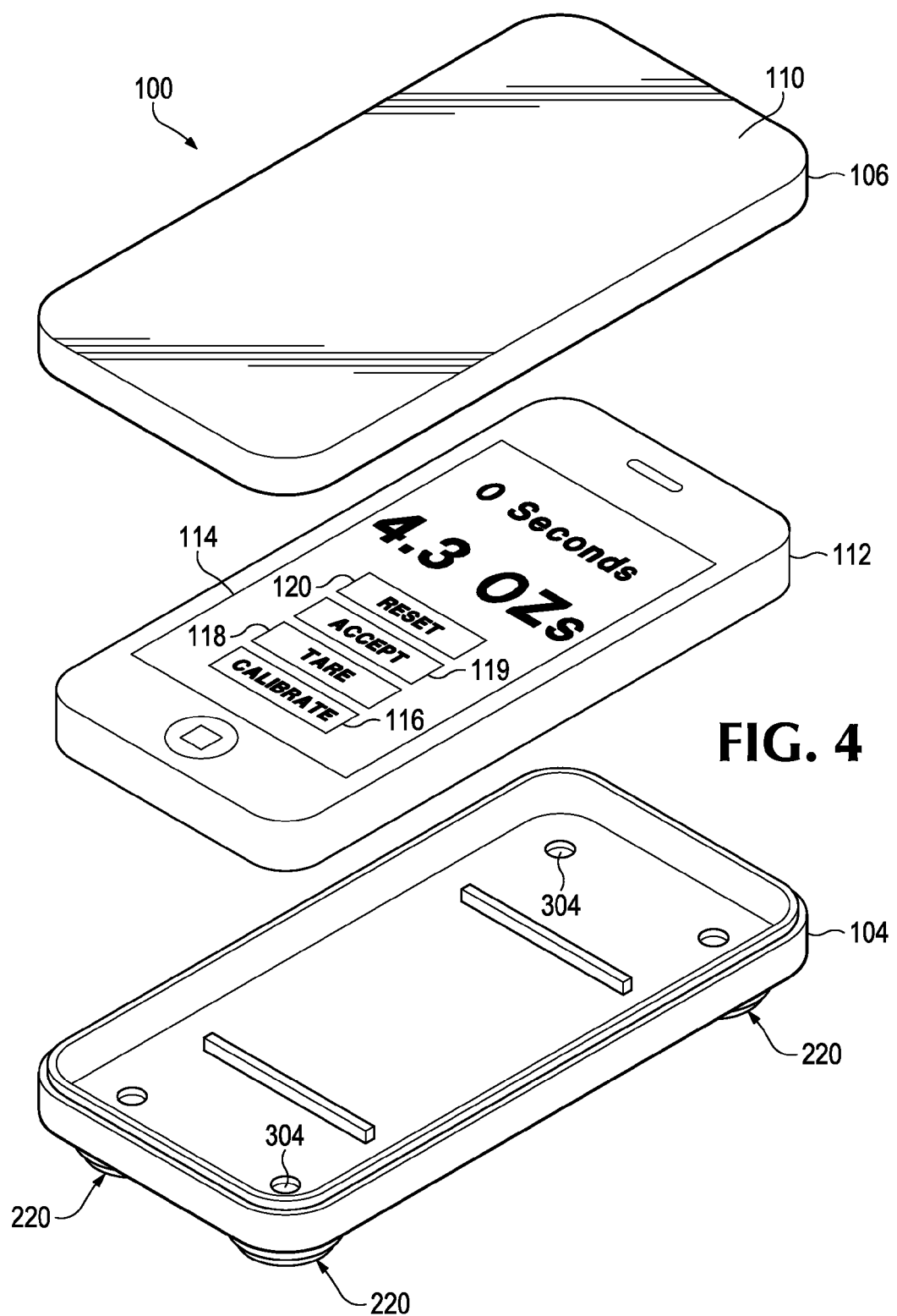
FIG. 4 is an exploded perspective view of the weighing assembly of FIG. 1 in an open or disassembled state.

FIG. 1 is a perspective view of a weighing assembly 100 in accordance with a first embodiment. In this embodiment, a rigid enclosure 102 comprises a bottom portion 104 and a top portion 106. The top portion 106 may include a transparent window 110. Top portion 106 and bottom portion 104 are configured to join together along a seam or joint 115. For example, joint 115 may comprise an overlap or rabbet joint 312 as shown in FIG. 3. Other seams or joints may include a gasket or other intermediary member configured to form a seal between the top portion 106 and bottom portion 104. Top portion 106 and bottom portion 104 may join to enclose a mobile device 112 in a substantially air-tight chamber 302 (see FIG. 3).

In an example, transparent window 110 may be made of a variety of materials known to those of skill in the art configured to communicate a signal and/or pressure to a touch screen sensor of mobile device 112, such as, for example, a capacitative and or resistive material or assembly. In another example, a controller including Bluetooth® and/or other wireless method of communication may be used to communicate commands to mobile device 112 while enclosed in chamber 302.

FIG. 2 illustrates a bottom perspective view of the weighing assembly 100 of FIG. 1 showing a plurality of foot assemblies. In an example, weighing assembly 100 comprises a plurality of foot assemblies 220. Each foot assembly 220 may comprise a cylinder 222 and a foot 226 arranged as a captive piston within the cylinder 222. In an example, cylinders 222 may be pneumatic cylinders.

FIG. 3 is a cross-sectional view of weighing assembly 100 taken along line 3-3 of FIG. 1. Weighing assembly 100 may comprise chamber 302 in communication with channels 304. Chamber 302 may be substantially air-tight. Each of channels 304 may be in communication with a corresponding foot assemblies 220. In an example, if an item is placed on surface 110 of weighing assembly 100, feet 226 may be displaced within chambers 306 of cylinder 222 a distance proportional to the weight of the item. Displacement of feet 226 within chambers 306 may displace gases within chamber 306. Displaced gasses may be communicated to chamber 302 via channels 304 changing the pressure of the gases within chamber 302. A pressure change within chamber 302 may be measured using a barometer either incorporated into weighing assembly 100 and/or a mobile communication device 310. Mobile device 310 may be disposed within chamber 302. A change in barometric pressure may be correlated to the weight of an item placed atop surface 110.

In an alternative embodiment, a rigid plastic box may be used with a plastic bag enclosed therein provide a sealing agent inside of the rigid container. The rigid container may be rectangular or cylindrical with a floating first half, and a second half that rests on a fixed surface. These halves can have a seal between them or simply fit snugly with a sealed plastic bag within. The mobile device may be placed in the bag and then the bag in the container. Changes in barometric pressure responsive to the weight of an item being weighed may be used to estimate the weight after calibration.

In an example, mobile device 310 may store a software application for estimating a weight of an object disposed on surface 110 based on a change in barometric pressure within chamber 302. Mobile device 310 may include a built-in barometric pressure sensor accessible to the weighing application via an application programming interface (API) that may be associated with the weighing application. Again, using an API to access the barometer function, a software application ("app") can be provided for weighing operations. The new scale can be calibrated using objects having known weights. The scale can be used for a variety of things. In one scenario, it can be used at a pick-up or collection point for processing mail or parcel items in the field prior to speed accurate delivery. For example, a single (preferably ruggedized) portable device can implement weighing, as explained above, as well as mobile OCR, address recognition and correction, and label printing. Then the subject parcel is "good to go" while minimizing subsequent handling for delivery, and the delivery address is likely to be valid. In general, the disclosed scale can be part of an effective decentralized parcel handling process.

Referring again to FIG. 1, mobile device 112 may be configured to display a graphical user interface (GUI) 114 including one or more soft buttons and a display area for showing a calculated weight. A process for weighing an item may begin by calibrating the weighing application. A user may select a "calibrate" soft button 116 to activate the weighing application to begin a calibration routine which may include weighing items of known weight using weighing assembly 100. Other calibration methods may be used and claimed subject matter is not limited in this regard.

A user may select an "accept" soft button 119 to accept and/or store a particular weight, tare and/or calibration operation. A user may select a "reset" soft button 120 to reset the weighing application, perhaps after calibrating and/or weighing an item. The weighing application may be configured to tare an item to be weighed by resetting a weight to zero when a user selects a "tare" soft button 118.

In an example, mobile device 112 may be disposed in chamber 302. After calibration of the weighing application, an item may be weighed by placing it on surface 110 of weighing assembly 100. A change in barometric pressure within chamber 302 responsive to a displacement of piston 226 within cylinder 220 due to a downward force exerted on surface 110 by the item may be measured by the weighing application and correlated to a weight of the item.

FIG. 4 is an exploded perspective view of an example of weighing assembly 100 of FIG. 1 in an open or disassembled state. Top portion 106 and bottom portion 104 are configured to encase mobile device 112. Bottom portion 104 comprises several channels 304 each disposed over a foot assembly 220.

Figure 5:
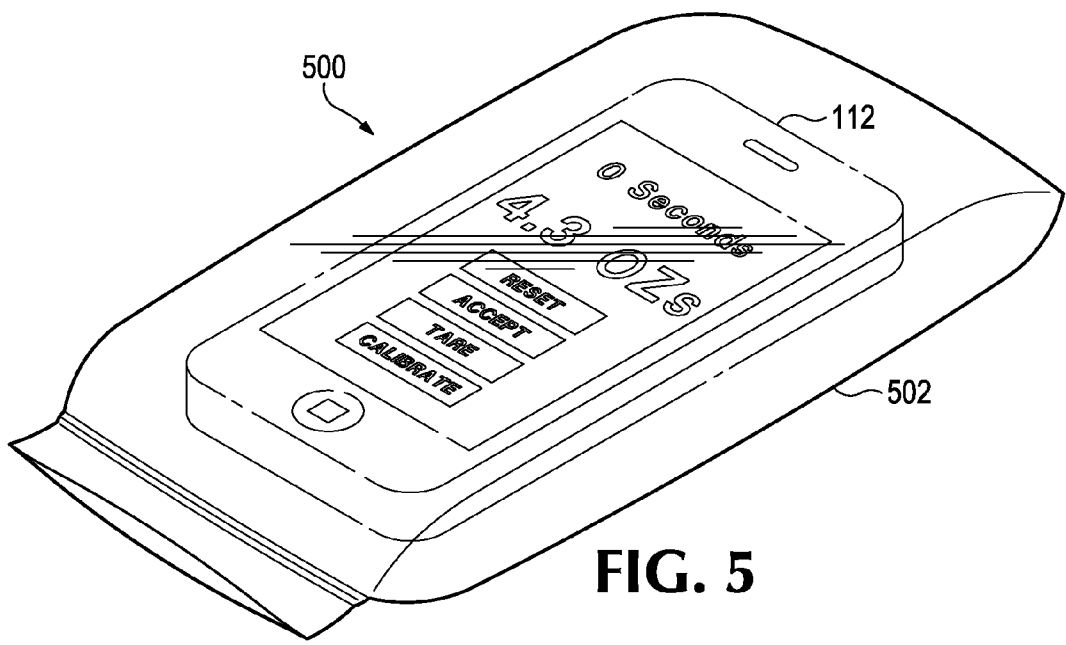
FIG. 5 is a perspective view of a weighing assembly in accordance with a second embodiment, incorporating a re-sealable, flexible enclosure.

FIG. 5 is a perspective view of an example of a weighing assembly 500, incorporating a sealable, flexible enclosure 502. Enclosure 502 may be a plastic sandwich bag, a rubber glove, plastic envelope and/or any sealable flexible enclosure.

In an example, mobile device 112 may be sealed inside enclosure 502. The weighing application on mobile device 112 may be calibrated as described above with respect to FIG. 1. A weighing application onboard mobile device 112 may take an initial barometric pressure. An item may be weighed by disposing the item on enclosure 502 which may change the barometric pressure inside enclosure 502. The weighing application onboard mobile device 112 may take a subsequent barometric pressure reading. Weighing application may determine a change in barometric pressure due to the added weight of the item place on enclosure 502 and may estimate the weight of the item based on the change.

Figure 6:
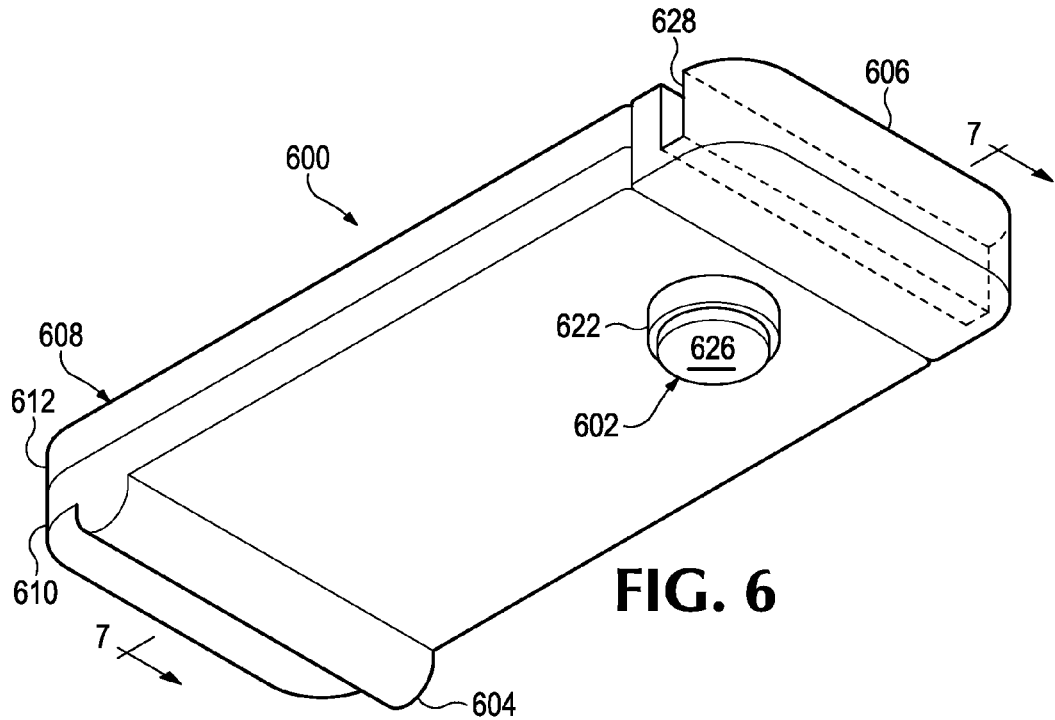
FIG. 6 bottom perspective view of a weighing assembly in a third embodiment, utilizing an integral fixed foot, a cylindrical foot assembly, and an item receptacle.

FIG. 6 is a bottom perspective view of a weighing assembly 600 in a third embodiment, utilizing a semi-cylindrical foot assembly 602, an integral fixed foot 604, and an item receptacle 606. In this embodiment, a rigid enclosure 608 comprises a bottom portion 610 and a top portion 612. The top portion 612 may include a transparent window and/or the entire rigid enclosure 608 may be transparent. Item receptacle 606 may be integrated with top portion 612 and/or bottom portion 610. Alternatively, item receptacle 606 may be removable and may be coupled to top portion 612 and/or bottom portion 610 by any method known to those of skill in the art. Top portion 612 and bottom portion 610 are configured to join together along a seam or joint 614 to form a seal between the top portion 612 and bottom portion 610. Top portion 612 and bottom portion 610 may join to enclose a mobile device 112 (see FIG. 1) in a substantially air-tight chamber.

In an example, cylindrical foot assembly 602 may comprise a cylinder 622 and a foot 626 configured to extend into a chamber of cylinder 622 similar to a piston action. A downward force exerted by an item placed in item receptacle 606 may cause foot 626 to extended into cylinder 622. In an example, foot 626 may be a pneumatic piston, a spring loaded piston and/or the like.

In an example, receptacle 606 may include slot 628 which may be configured to hold an item to be weighed such as a letter envelope. In another embodiment, receptacle 606 may have any shape configured to hold, contain, balance and/or otherwise support an item to be weighed and claimed subject matter is not limited in this regard.

FIG. 7 is a cross-sectional view of the weighing assembly 600 of FIG. 6 taken along line 7-7 of FIG. 6 and showing an integrated item receptacle. Weighing assembly 600 may comprise chamber 702 in communication with channel 704. Chamber 702 may be substantially air-tight. Channel 704 may be in communication with foot assembly 602. Mobile device 112 may be disposed within chamber 708 on supports 706.

In an example, if an item is placed in slot 628 to be weighed, foot 626 may depress spring 710 and may extend into chamber 708 of cylinder 622 a distance proportional to the weight of the item. Displacement of foot 626 within chamber 708 may displace gases within chamber 708. Displaced gasses may be communicated to chamber 702 via channel 704 changing the pressure of the gases within chamber 708. As discussed above, a pressure change within chamber 708 may be measured using a barometer either incorporated into weighing assembly 600 and/or a mobile communication device 112. A change in barometric pressure may be correlated to the weight of an item supported in slot 628 by a weighing application executable on mobile device 112.

FIG. 8 is a side view of an example of a weighing assembly 800 showing a removable item receptacle 802. FIG. 8 also illustrates an electronic load cell 804 arranged on a bottom side of weighing assembly 800 similar to foot assembly 602 described with respect to FIG. 7. In an alternative embodiment, multiple load cells may be used. Load cell 804 is arranged to sense force pushing upward on the cell when the mobile device 812 is stationed on a generally flat, rigid surface (not shown). The stationary or fixed foot 806 acts like a fulcrum, so that a force or weight from an item to be weighed is transferred to load cell 804. In this embodiment, no air tight container is required.

The item to be weighed may be placed on the top side 810 of weighing assembly 800. The item may be, for example, an envelope or mail item. Alternatively, the item may be placed in receptacle 802. Receptacle 802 may be integrally formed with mobile device 812 (as in FIG. 7) or may be removable (as in FIG. 8). For example, receptacle 802 may comprise a plug 817 that may fit in port 818. An alternative receptacle 803, for example, may have a cup shape for holding granular or otherwise "loose" materials 822 for weighing, for example, spices, herbs, chemicals or any other substance. The material to be weighed may be a liquid, gelatinous, solid or any other form. Plug 820 may fit in port 818 as well. In an example, receptacle 803 may comprise an extended or extendable arm coupled between plug 820 and receptacle 803 older to increase the moment arm of receptacle 803 and thereby to increase sensitivity of the weighing application.

The load cell 804 may be coupled to mobile device 812 electronics by a cable or integral wiring (not shown). In some embodiments, mobile device 812 may comprise a wireless receiver 814. Load cell 804 may be coupled to a wireless transmitter 816. Load cell 804 may communicate with mobile device 812 wirelessly, for example, by short-range wireless technology such as Blue Tooth®. Coupling to the mobile device 812 electronics may be arranged to enable a processor in the mobile device 812 to receive data indicative of a force sensed and reported by the load cell. The load cell data may be used for zeroing (tare), calibration and/or weighing operations. Preferably, a processor in the mobile device 812 may access and utilize the load cell data under control of a weighing application program. The application program may be stored in machine-readable memory in mobile device 812.

FIG. 9 is a side view of a fifth embodiment showing an alternative item receptacle 900. In an example, item receptacle 900 may comprise an item support 902 disposed within chamber 904. Item support 902 may be a piston and may respond to a downward force applied by an item to be weighed poised in item receptacle by extending downward into chamber 904. Extension of item support 902 into chamber 904 may compress gasses in chamber 904. Gasses in chamber 904 may be communicated via channel 906 to a chamber 908 enclosing a mobile communication device 910 (as described above with respect to FIG. 3) configured with a weighing application to estimate the weight of the item to be weighed based on detected barometric pressure.

Figure 10:
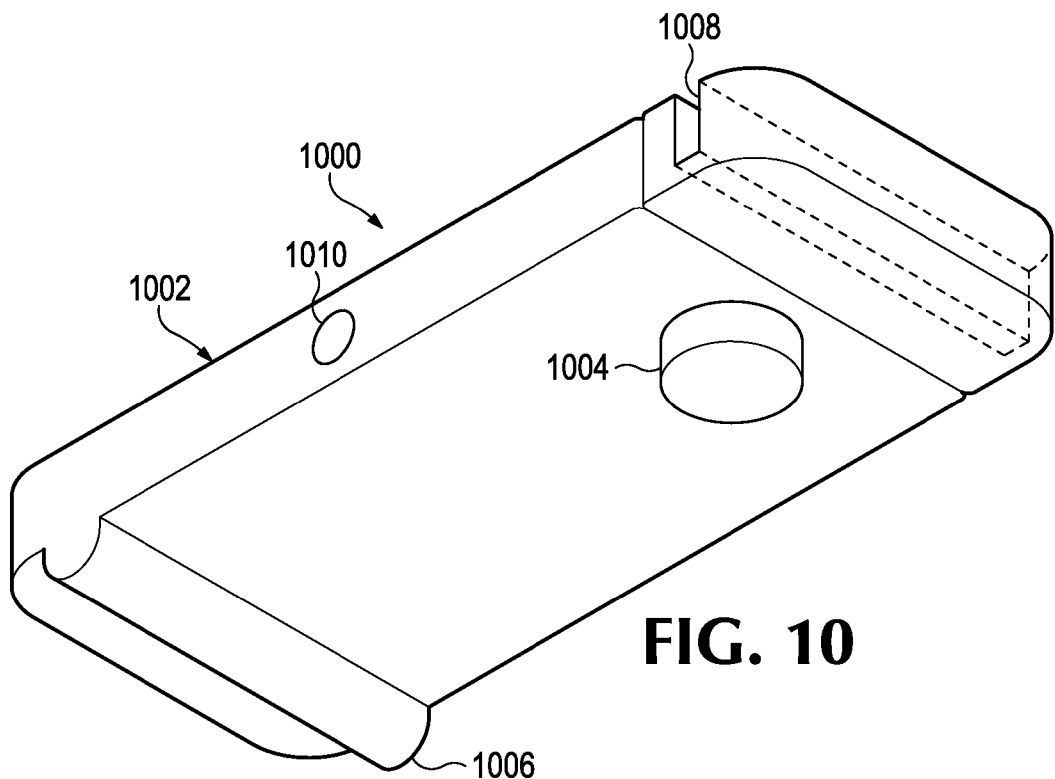
FIG. 10 is a bottom perspective view of sixth embodiment showing a compressible foot.

FIG. 10 illustrates an example of a weighing assembly 1000 comprising a mobile communication device 1002 having a foot 1004 comprising a compressible elastic material and an integral fixed foot 1006 configured to act as a fulcrum to allow depression of compressible foot 1004 to temporarily change an orientation of mobile device 1002. Mobile device 1002 may comprise a position or orientation sensor 1010 (e.g., for gaming applications) configured to sense how mobile device 1002 is oriented in three dimensions. For example, a scale application preferably determines a vector sum of weights in all 3 axis' to compute a weight. In some embodiments data may be acquired from multiple sensors, for example, orientation, position, acceleration, etc. In these embodiments, no air tight container is necessary.

A weighing application stored on mobile device 1002 may access orientation data generated by orientation sensor. The weighing application may estimate a weight of an item placed on a top surface 1020 of mobile device 1002 or in receptacle 1008 based on a change in orientation of mobile device 1002 resulting from a downward force applied on mobile device 1002 by the item. The weighing application may be calibrated by first identifying an original orientation and then by identifying an orientation of mobile device 1002 responsive to weighing various items of known weight. A tare mode may "zero" out the weighing application at a starting orientation which may be different from the initial orientation.

In an example, the compressible material may be rubber and/or silicone or a suitable polymeric material. It should be designed to recover to its uncompressed dimensions when the weighing item is removed, in a repeatable fashion. In another example, foot 1004 may comprise a pneumatic piston and cylinder assembly or a spring loaded piston and cylinder assembly or the like (as in FIG. 6). In an example, the item may be placed in receptacle 1008. Receptacle 1008 may be integrally formed with mobile device 1002 (as in FIG. 7) or may be removable (as in FIG. 8). An alternative receptacle may have a cup shape (see FIG. 8).

Figure 11:
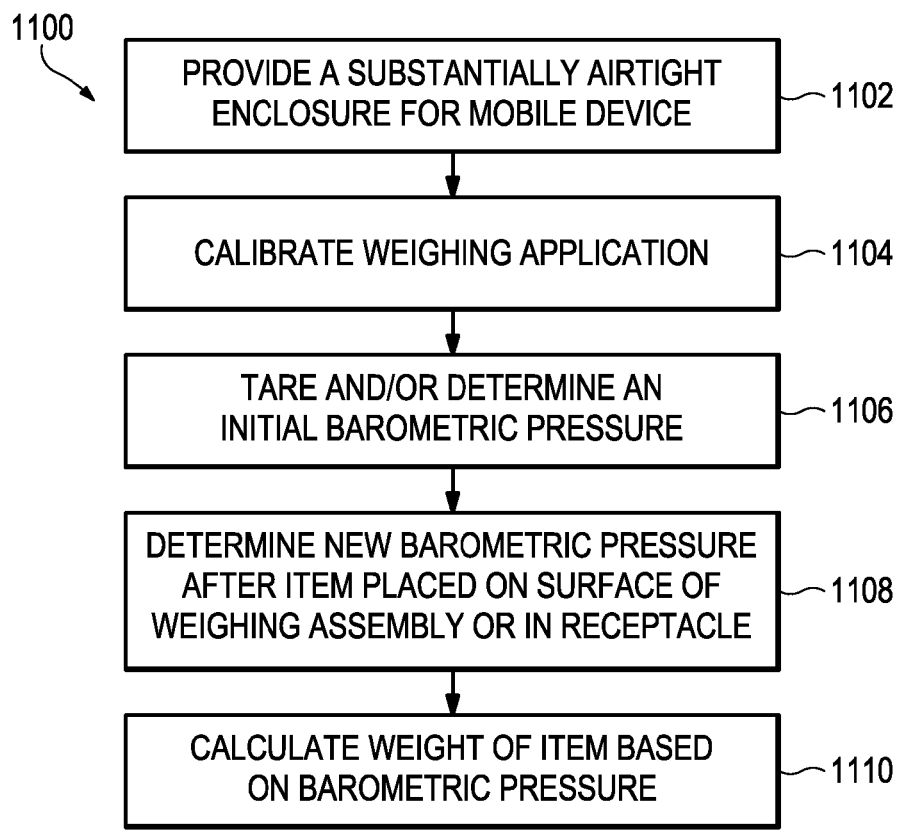
FIG. 11 is an example of a flow diagram illustrating a weighing process.

FIG. 11 illustrates an example of a process 1100 for weighing an item using a mobile device equipped with a barometric pressure sensor. At operation 1102, a mobile device may be placed in an airtight enclosure. The enclosure may comprise a weighing assembly as described with respect to FIGS. 1-7 and 9. At operation 1104, a weighing application stored on the mobile device may be calibrated, for example, by weighing various items of known weights based on barometric pressure readings. At operation 1106, a weighing application may take an initial barometric pressure reading and/or may set the reading to zero to perform a tare operation. At operation 1108, an item to be weighed may be placed on a surface of the weighing assembly and/or in an item receptacle and a new barometric pressure may then be determined. At operation 1110, the weighing application may calculate/estimate the weight of the item based on a change in barometric pressure from the initial or tare barometric reading.

Figure 12:
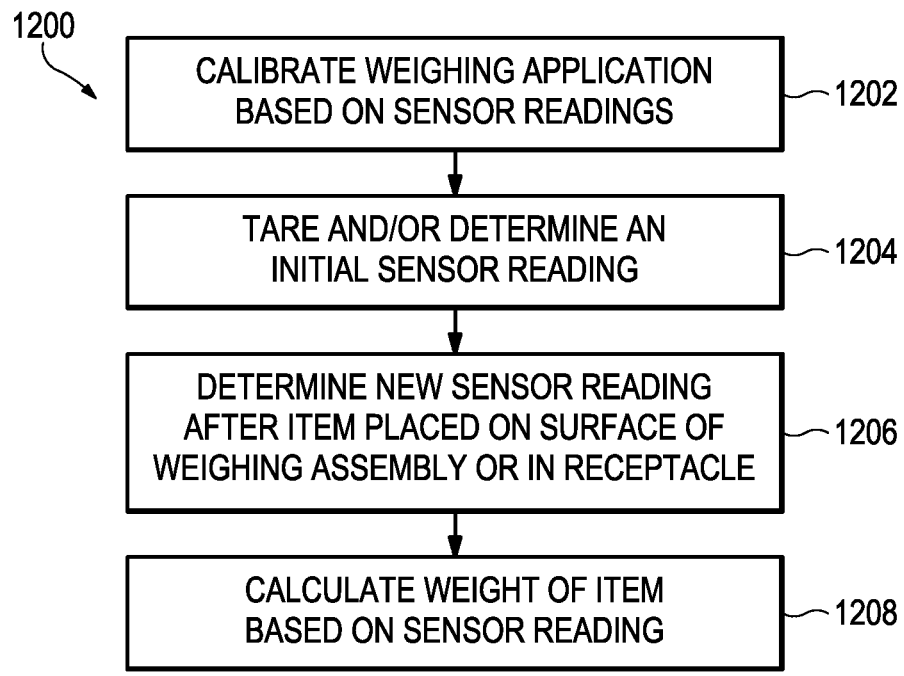
FIG. 12 is a second example of a flow diagram illustrating a weighing process.

FIG. 12 illustrates an example of a process 1200 for weighing an item using a mobile device equipped with a load and/or orientation sensor. The mobile device may be equipped with a weighing assembly as described with respect to FIGS. 8 and/or 10. At operation 1202, a weighing application stored on the mobile device may be calibrated, for example, by weighing various items of known weight based on load or orientation sensor readings. At operation 1204, a weighing application may take an initial load or orientation sensor reading and/or may set the reading to zero to perform a tare operation. At operation 1206, an item to be weighed may be placed on a surface of the weighing assembly and/or in an item receptacle as described above and a new load or orientation sensor reading may then be determined. At operation 1208, the weighing application may calculate/estimate the weight of the item based on a change in barometric pressure.

Figure 13:
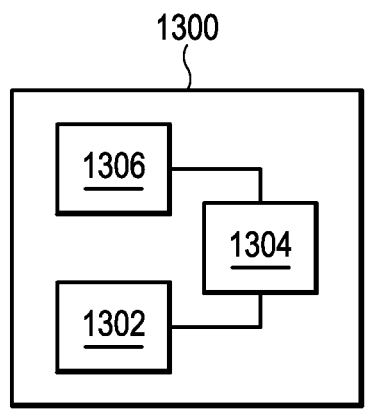
FIG. 13 is a block diagram of a mobile communication device comprising a weighing application in communication with processor.

FIG. 13 is a block diagram of a mobile communication device 1300 comprising a weighing application 1302 in communication with processor 1304 configured to access and utilize sensor 1306 data under control of weighing application program 1302.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention. The scope of the present invention should, therefore, be determined only by the following claims.

The invention claimed is:

1. A portable weighing assembly comprising:
   a smart phone having a built-in barometer;
   a substantially airtight enclosure sized to enclose the smart phone;
   wherein the enclosure is arranged to receive an item placed on the enclosure for weighing, and to transfer a weight of the placed item so as to increase a barometric pressure inside the enclosure, for sensing by the smart phone barometer; and
   a weighing application program stored in machine-readable memory in the smart phone, the weighing application program including code executable by a processor in the smart phone to cause the processor to interface with the barometer, and to translate a barometer reading to a weight.

2. The assembly of claim 1 wherein the enclosure is formed of a flexible material.

3. The assembly of claim 1 wherein the enclosure includes a substantially transparent window portion to enable viewing a display screen of the smart phone.

4. The assembly of claim 1 wherein the weighing application program includes code for calibrating the weighing function.

5. A method for weighing an item, comprising:
   disposing inside a substantially airtight enclosure, a two-way mobile communications device capable of person to person communication;
   sealing the enclosure;
   wherein the enclosure is arranged to receive an item placed on the enclosure for weighing, and to transfer a weight of the placed item so as to increase a barometric pressure inside the enclosure;
   receiving, in the mobile communication device, an initial sensor reading from a barometric pressure sensor integral with the mobile communications device;
   receiving, in the mobile communications device, a subsequent sensor reading from the barometric pressure sensor, wherein the subsequent sensor reading is responsive to the weight of the item placed on the enclosure;
   comparing, by the mobile communications device, the initial sensor reading and the subsequent sensor reading; and
   determining, by the mobile communications device, a weight of the placed item based on the comparison.

6. The method of claim 5, wherein the determining is further based on identifying, by the mobile communications device, a plurality of barometric pressure sensor readings based on known item weights.

7. A portable weighing assembly comprising:
   a smart phone having a built-in orientation sensor;
   a compressible elastic foot extending from an underside of the smart phone and arranged for changing an orientation of the smart phone as the foot is compressed responsive a weight of an item placed on top of the smart phone for weighing; and
   a weighing application program stored in machine-readable memory in the smart phone, the weighing application program including code executable by a processor in the smart phone to cause the processor to interface with the orientation sensor in the phone, and to translate a change in orientation in the orientation of the smart phone to a weight of the item placed on top of the smart phone for weighing.

* * * * *